United States Patent [19]
Fuhrer et al.

[11] Patent Number: 5,940,816
[45] Date of Patent: Aug. 17, 1999

[54] MULTI-OBJECTIVE DECISION-SUPPORT METHODOLOGY

[75] Inventors: Robert Mack Fuhrer, New York; Raymond T. Henry, Fishkill; Rama Kalyani T. Akkiraju; Robin Lougee-Heimer, both of Ossining; Seshashayee Sankarshana Murthy, Elmsford; John Nathan Rachlin, Tarrytown; Martin C. Sturzenbecker, Carmel, all of N.Y.; Frederick Yung-Fung Wu, Cos Cob, Conn.

[73] Assignee: International Business Machines Corporation, Armonk, N.Y.

[21] Appl. No.: 08/790,641

[22] Filed: Jan. 29, 1997

[51] Int. Cl.⁶ .................................................. G06F 15/18
[52] U.S. Cl. ................................................................ 706/13
[58] Field of Search ......................... 706/13; 395/200.32

[56] References Cited

U.S. PATENT DOCUMENTS

| | | | |
|---|---|---|---|
| 5,222,192 | 6/1993 | Shaefer | 706/13 |
| 5,319,781 | 6/1994 | Syswerda | 706/13 |
| 5,586,218 | 12/1996 | Allen | 706/13 |
| 5,651,098 | 7/1997 | Inoue et al. | 706/13 |

OTHER PUBLICATIONS

T. Shibata and T. Fukuda, "Coordinative Behavior in Evolutionary Multi–Agent–Robot System," Proc. 1993 IEEE/RSJ Int'l. Conf. on Intelligent Robots and Systems, pp. 448–453, Jul. 1993.

S. Handley, "The Genetic Planner: The Automatic Generation of Plans for a Mobile Robot Via Genetic Programming," Proc. 1993 Int'l. Symp. on Intelligent Control, pp. 190–195, Aug. 1993.

B. Sheth and P. Maes, "Evolving Agents for Personalized Information Filtering," Proc. 9th IEEE Conf. on AI for Applications, pp. 345–352, Dec. 1993.

H. Sakanashi and Y. Kakazu, "Co–Evolving Genetic Algorithm with Filtered Evaluation Function," 1994 IEEE Symp. on Emerging Technologies and Factory Automation, pp. 454–457, Nov. 1994.

B. Fulkerson and V. Parunak, "The Living Factory: Applications of Artificial Life to Manufacturing,"Proc. Second Int'l. Symp. on Autonomous Decentralized Systems, pp. 391–397, Apr. 1995.

L. Bull, et al., "Evolution in Multi–agent Systems: Evolving Communicating Classifier Sysytems for Gait in a Quadrupedal Robot," Proc. Sixth Int'l. Conf. on Genetic Algorithms, pp. 382–388, Jul. 1995.

F. Abbattista, et al., "An Evolutionary and Cooperative Agents Model for Optimization," Proc. 1995 IEEE Int'l. Conf. on Evolutionary Computation, vol. 2, 4 pages, Nov. 1995.

*Primary Examiner*—Robert W. Downs
*Attorney, Agent, or Firm*—Scully, Scott, Murphy & Presser; Stephen C. Kaufman, Esq

[57] ABSTRACT

A method for effecting computer implemented decision support. The method can improve on a candidate solution by allowing problem solving methods to cooperate towards the creation of a more desirable solution. The method can realize an enhanced understanding of tradeoffs inherent in competing objectives, and can incorporate factors or special considerations not easily specified, by enabling the decision maker to actively participate in the creation of a more desirable solution.

54 Claims, 4 Drawing Sheets

MULTI-OBJECTIVE DECISION-SUPPORT METHODOLOGY

BACKGROUND OF THE INVENTION

This invention relates to a method for effecting computer implemented decision-support.

INTRODUCTION TO THE INVENTION

When a manufacturer produces goods, it is preferable to determine the best manner in which to implement the manufacture and distribution of those goods to customers and/or warehouses. In the following, for the sake of pedagogy, we reference in particular the problem of transportation planning. When making these determinations, human schedulers must consider many factors, including but not limited to:

a) vehicle availability;

b) vehicle loading constraints including volume and weight limits or special requirements pertaining to the physical characteristics of the product;

c) item production and due dates;

d) transit time;

e) loading dock restrictions;

f) carrier rates;

g) customer unloading restrictions;

h) customer preferences;

i) item characteristics such as physical dimensions, perishability, or special handling requirements.

There is usually no single solution that addresses all of these objectives simultaneously. For example, a solution which makes use of a least-cost mode of transportation may deliver items to the customer after the required due date, or may violate loading dock restrictions that lead to disruptions. While some constraints are physical in nature (there is only so much physical space in a boxcar), other constraints may reflect "preferences" that can be violated under special circumstances, and at the discretion of the scheduler. Thus, the transportation planner faces two fundamental problems:

a) generating solutions which account for different objectives and constraints, and b) choosing a single solution from among multiple alternatives.

SUMMARY OF THE INVENTION

We have discerned that a common method for generating a solution under these circumstances is to define policies or rules that effectively limit the possible candidates. If these policies do not reduce the choices to a single solution, then the final solutions may be regarded as equivalent, and the planner may choose any one of the remaining solutions at random. An example of a set of rules, with particular pertinency to transportation planning, which can reduce the number of available choices, is as follows:

a) eliminate all solutions that violate vehicle loading restrictions;

b) of those solutions which remain, eliminate all solutions which do not deliver the product to the customer on time (If all solutions are eliminated, choose the solution whose lateness is minimum);

c) choose the solution with the lowest total cost.

We have further discerned that there are a number of difficulties with this approach. From the point of view of a human planner, this approach may be inflexible, and thus may not allow the planner to take into account special contingent information not reflected within the existing rules. For example, a planner may know that even though there is some level of tardiness within a particular solution, the customer has ordered goods prior to when they will actually be required, and therefore, no customer dissatisfaction will result from a small degree of tardiness as measured from the point of view of the customer-specified due dates. In short, this approach prevents a human scheduler from understanding the tradeoffs between multiple solution alternatives.

We observe that another common method for choosing an appropriate solution is to define an objective function:

$$f(x_1, x_2, \ldots, x_n) = \sum_{i=1}^{n} w_1 x_i$$

where $w_i$ is a weighting factors for objective value $x_i$. The problem then becomes one of selecting appropriate weighting factors, and employing a search device to define a solution which, when evaluated across each objective $X_1 \ldots X_n$, will yield a minimum value for the function f. Unfortunately, this approach, though quite common, has several important limitations.

1. It is difficult or impossible for the manufacturer to define weighting factors that produce acceptable solutions in all circumstances. Many objectives such as customer preferences reflect general quality considerations that cannot be reliably quantified (for example, by associating a dollar value on lost sales due to customer dissatisfaction).

2. The weights are an attempt to define the relative importance of different objectives. In real-world planning environments, the relative importance of these different objectives is constantly changing. While in principle, a human scheduler could then simply assign different weighting factors over time, in practice this is considered undesirable because of the constant effort involved.

3. These weights imply a linear correlation between two objectives, when in reality, the relative importance of two objectives may be non-linear. For example, while the scheduler may tolerate small customer dissatisfaction in order to achieve the lowest possible delivery cost, in practice, the scheduler may limit the amount of potential cost savings to ensure that the customer does not become too dissatisfied. Thus, cost savings may become relatively less important as customer dissatisfaction increases.

There are a number of existing methods for generating a particular solution based upon this composite function, including linear programming and mixed integer programming, but these methods are applicable only when the problem constraints take a specific form. In the context of a genetic algorithm approach, this objective function is alternatively known as a fitness function. Solution generation systems which make use of the aforementioned objective functions are of limited use in real-world transportation planning environments for many of the reasons that the objective function itself is limited as a basis for solution selection: the solutions are inherently inflexible to changing circumstances, and operators of such solution generation systems must figure out how to modify the underlying objectives or the associated weighting factors in order to produce solutions that meet current objectives.

In accordance with the foregoing discussion, we have now discovered a novel method for effecting computer implemented decision-support, which method addresses and solves the problems alluded to in the foregoing discussion.

The novel method comprises the steps of:

1) inputting to the computer data comprising information relevant to a specified problem;
2) choosing a set of solution generators for the specified problem;
3) instantiating the set of solution generators in memory;
4) running in a CPU the set of solution generators for producing a set of candidate solutions relevant to the specified problem;
5) filtering the set of candidate solutions for producing at least one selectable candidate solution in accordance with an independent metric;
6) outputting on a display the at least one selectable candidate solution; and
7) dynamically interacting with the at least one of selectable candidate solutions for generating a refined set of candidate solutions from the at least one selectable candidate solution.

The novel method as defined can realize significant advantages including:

1. Improved solution optimality by allowing problem solving methods to cooperate towards the creation of a solution.
2. Greater reliability-because the method does not depend upon any single problem solving approach or algorithm.
3. Greater responsiveness to a decision maker's changing objectives.
4. Enhanced understanding of the tradeoffs inherent in competing objectives, through presenting valuations of candidate solutions.
5. Incorporation of factors or special considerations not necessarily reflected in current objectives, by making manual modifications to one or more solutions, and by actively participating in the creation of the final solution.

DETAILED DESCRIPTION OF THE DRAWING

The invention is illustrated in the accompanying drawing, in which.

Figure 3:
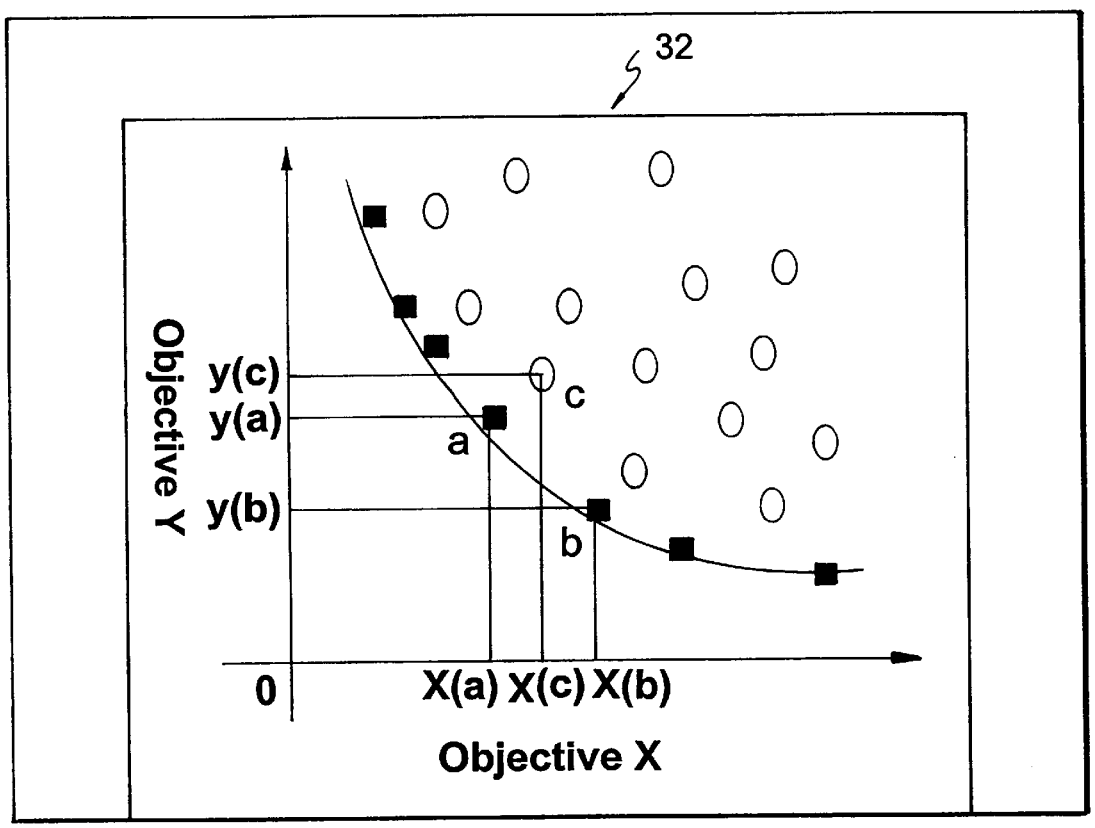
Figure 4:
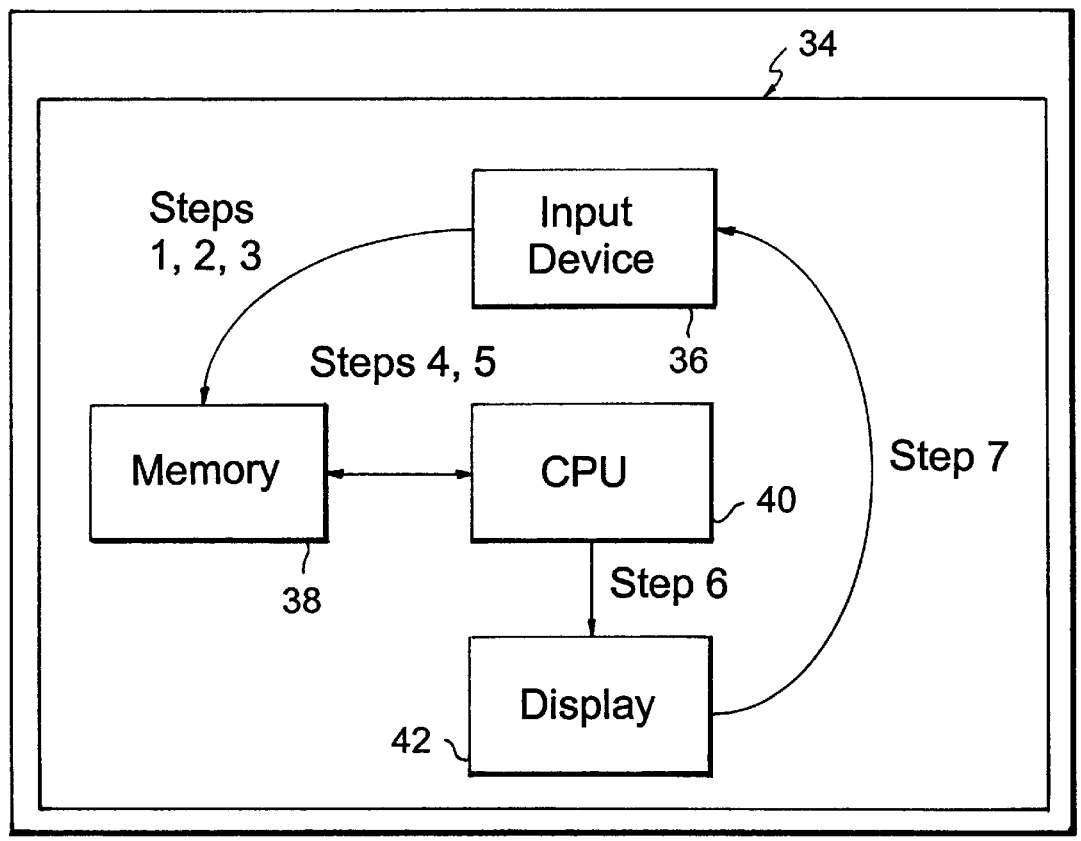

FIG. 3 comprises a graph showing the non-dominated set for two objective problems; and FIG. 4 shows a schematic suitable for machine implementation of the novel method.

DETAILED DESCRIPTION OF THE PRESENT INVENTION

In this section, we disclose a methodology for effecting computer implemented decision-support. For the sake of pedagogy, we reference in particular the problem of transportation planning. In this regard, we note that the reference to transportation planning is merely illustrative, and that those skilled in the art will have no difficulties, given the following instruction, in realizing the novel method in other problem areas, including, for example, scheduling of paper production, or production planning.

Figure 1:
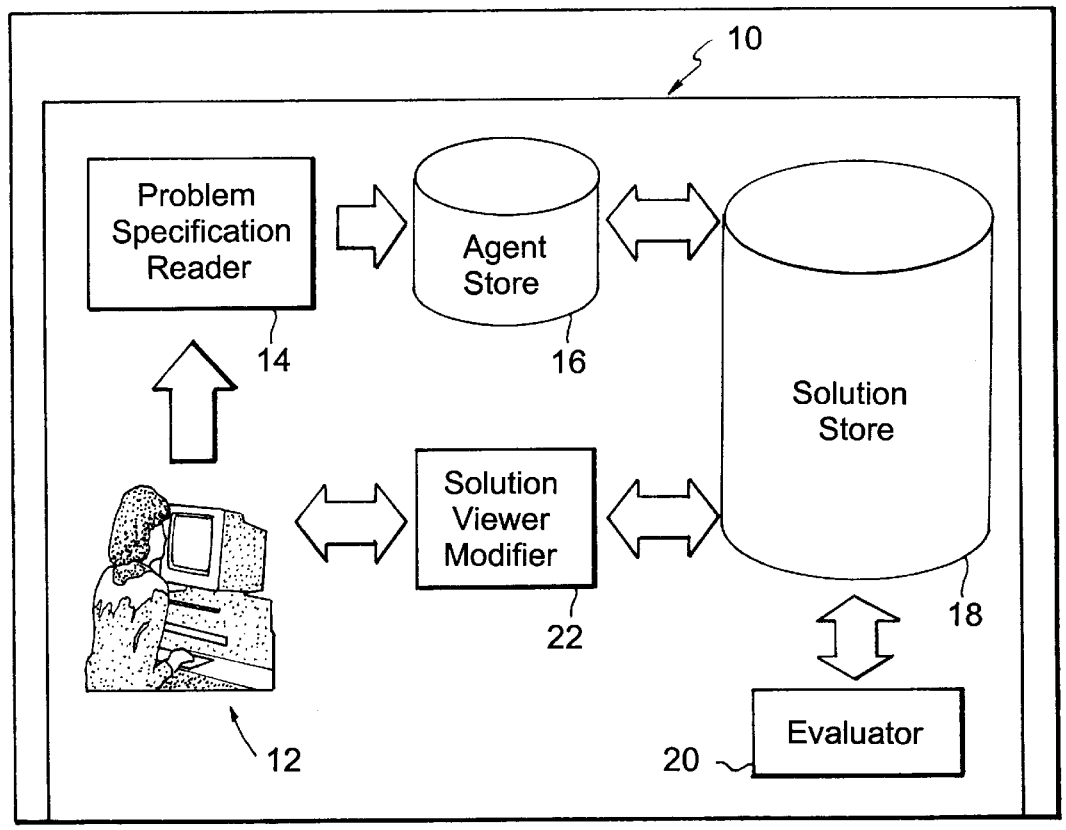
FIG. 1 shows principal aspects of a multi-objective decision support methodology.

Attention is now directed to FIG. 1, which shows a multi-objective decision support methodology 10 comprising the following six aspects.

An operator 12 is a (human) user of the method and a decision maker.

A problem specification reader 14 comprises an input device that can collect information relevant to a particular problem. For transportation planners, this information can include products to transport, carrier rates, vehicle weights, and volume constraints, customer profiles, and so on. This information may be entered manually by the operator, or derived from the manufacturers logistics/order-entry system.

An agent store 16 comprises a collection of solution generators (algorithms). Each agent preferably has the following characteristic: it reads as input 0 or more solutions along with data defining a particular problem, and writes out 0 or more solutions. Agents may be categorized as follows:

a) Constructor agents can create solutions and place them into the solution store.
b) Improver agents can take as input one or more existing solutions and can output one or more new solutions.
c) Destroyer agents can remove solutions from a solution store.

A solution store 18 comprises a collection of solutions to which all agents in the agent store can have access.

An evaluator 20 can take as input a solution and can output a list of numerical values each corresponding to a particular objective value.

A solution viewer and modifier 22 can allow the operator to examine a particular solution in the solution store. If there exists a solution that meets the operator's objectives, this solution is chosen and the process is complete. If agents can achieve this level of performance consistently, then the method need not permit the decision maker to modify existing solutions. In complex manufacturing environments, there may be additional information that the operator can use to further improve a solution. An effective decision-support methodology attempts to provide the operator with a solution that is as close to the desired solution as possible, as often as possible.

OPTIONAL COMPONENTS OF THE METHOD THAT CAN ENHANCE SYSTEM PERFORMANCE FOR FLEXIBLE AND DYNAMICALLY CHANGING ENVIRONMENTS

Figure 2:
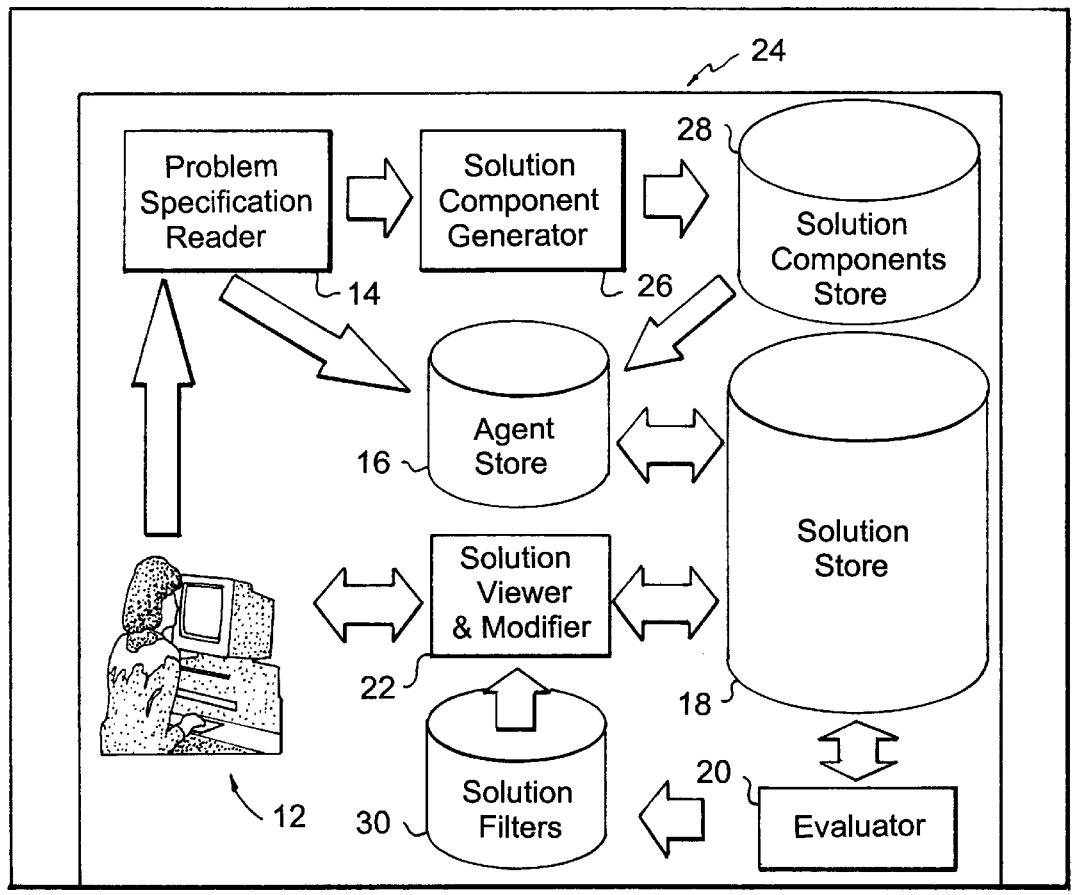
FIG. 2 shows components of the FIG. 1 methodology with optional components that may enhance system performance.

The following discussion utilizes information included in FIG. 2, numeral 24. A solution component is a part of a solution; one or more solution components are needed to make up a complete solution.

A solution component generator 26 (optional) can create solution components. This part of the method is optional if all of the solution generating agents (described below) formulate their solutions using only input specification data.

A solution components store 28 (optional) comprises a collection of solution components to which all agents in the agent store preferably have access. These components are optionally employed by constructor and/or improver agents to produce new solutions.

Solution filters 30 (optional) comprise methods preferably used by the operator to extract a subset of solutions for detailed examination. The operator may alternatively draw solutions directly from the population without passing them through a filter. There are a number of ways in which filters may be configured.

i) a NULL filter (not shown) allows any solution to pass through. This filter is useful if the user wants to retrieve all existing solutions from the solution store.
ii) a BOUND filter (not shown) places an upper and/or a lower bound on one or more objective values. Only solutions satisfying the bounds criteria are allowed to pass through.

iii) a NON-DOMINATED SET filter allows a solution to pass through only if there does not exist another single solution in the solution store whose objective value is better in at least one objective while being no worse for all other objectives. The behavior of the non-dominated set filter is shown in FIG. 3 (numeral 32). In this case, where the user seeks to minimize objective X and minimize objective Y solutions (a) and (b) do not dominate one another because solution (a) is better than solution (b) (i.e., has a smaller value) with respect to objective-X, whereas solution (b) is better than solution (a) with respect to objective-Y. Solutions (a) and (b) are both members of the non-dominated set because there are no solutions in the solution space that dominate either of them. By contrast, solution (c) is dominated by solution (a) because solution (a) is better than solution (c) with respect to both objectives. The description is readily generalized to three or more objectives. Another name for the non-dominated set is the Pareto frontier.

DESCRIPTION OF THE METHOD STEPS

When the method is started, and with reference to FIG. 2 and FIG. 4, numeral 34, it preferably begins by reading information relevant to the problem from a file, document, or database, or data may be entered by the operator 12. The problem specification reader 14 can extract this information and convert it into a format (data structure) that makes it readily accessible to further processing. (There is no set specification for these data structures, as they are problem specific.)

The solution component generator 26 preferably constructs pieces of a complete solution using the input data.

In the context of transportation planning, a solution component may consist of a plan for loading a single vehicle with a subset of items to be delivered to the customer, whereas the complete transportation plan may consist of whole collections of these subplans such that the items contained in all subplans actually chosen must equal the total to be delivered.

There are a number of techniques that can be used to generate solution components, and these techniques are problem dependent. Components may be randomly generated, systematically generated, exhaustively generated up to some specified limit, or produced using heuristics which define components that are likely to be useful to the problem. For example, in transportation planning, solution components consisting of vehicles that are full or nearly full of goods may be more useful than solution components representing vehicles that are empty or nearly empty, as it is usually one of the goals of transportation planning to reduce cost by using containers and vehicles efficiently. This demonstrates that solution component generation may be tied to particular objectives of the problem. The solution components are placed in the solution component store 28. A solution component generator and store is optional to the method, and may not be required if the problem domain to which the method is applied is not readily decomposable.

Agents in the agent store 16 preferably are autonomous, and preferably must determine for themselves when to turn themselves on or off. Agents may operate synchronously or in parallel, depending upon the computational environment in which they operate. Agents may be formulated as continually running processes executing in parallel on a multiprocessing computer. Each agent can represent a unique problem-solving methodology or a combination of methods. In some problem domains, the number of such methods may be very large. The specific agents that are in the agent store 16 are implementation specific.

If the solution store 18 is empty, as is the case when the method is started, then only constructor agents may operate. Constructor agents draw from the input specification or optionally from the solution component store data, which it then employs to form a complete solution. There may be one or more constructors in the agent store 16, and their output need not be deterministic. Constructor agents may run any number of times, and there is nothing to guarantee that all constructor agents will actually be invoked. Constructor agents are problem solving methods. The presence of multiple constructor agents recognizes the fact that some problem solving methods do not work well or at all given some input specifications.

A constructor agent may be designed to meet a particular objective or combination of objectives. Alternatively, a constructor agent may be specifically designed to capture a commonly employed heuristic problem solving method or a more complex optimization method, such as an agent employing linear programming.

Constructor agents may employ randomization techniques so as to produce a variant solution with each invocation. In the next section, we provide example constructor agents relevant to transportation planning.

Improver agents can create new solutions by modifying copies of existing solutions. (The original solution is left unchanged.) For a given problem domain, there are many possible improver agents. The specific improver agents employed as part of the methodology are implementation specific. An improver agent may make use of random modifications, heuristic methods, or other more complex mechanisms. An improver agent can be designed to modify solutions with respect to a particular objective or set of objectives. Individual improver agents are responsible for determining, for themselves, when they should be invoked, and upon which existing solutions they should operate. We will give specific examples of improver agents relevant to the problem of transportation planning in the next section.

Destroyer agents eliminate solutions from the solution store. Their purpose is to eliminate from further processing solutions which are unlikely to lead to acceptable results. Destroyer agents prevent the method from exceeding the capacity of the solution store 18. Destroyer agents, while not critical to the method's realization (assuming a sufficiently high capacity solution store) serve to enhance the method's performance by ensuring that improvers operate upon only those solutions which are "promising". Destroyer agents can employ many of the same techniques as solution filters, the difference being that filters do not eliminate solutions from the population, but rather restrict which solutions in the population are displayed to the operator. For example, a destroyer may eliminate all but the non-dominated set of solutions, or alternatively, the solutions which are dominated by a randomly chosen solution. Destroyers may eliminate solutions whose objective evaluation (fitness) is less than some specified value. (Different destroyer agents may encompass different objective functions.) Destroyers may also be employed to eliminate redundant or nearly redundant solutions, as it is the purpose of this method to generate a variety of alternatives that reveal meaningful tradeoffs between multiple objectives, and not simply to produce multiple solutions with only minor modifications.

The solution store 18 can act as a shared memory for all agents. Every solution that is placed in the population is preferably evaluated according to various criteria. These criteria may be problem specific, and preferably define the objectives employed by the operator to identify candidate solutions. The evaluator 20 is responsible for performing this task.

An important feature of the methodology of the present invention is the fact that the operator can act as an agent in the process of forming the population of solution alternatives. As noted above, this feature is not critical to the realization of the method, as long as the existing set of agents provide at least one satisfactory solution on a consistent basis. However, manual modification of existing solutions is often necessary in real-world manufacturing environments, because of the difficulty in building agents capable of incorporating the many possible special circumstances that invariably arise.

The operator may view a summary of the current population in which the summary consists of the evaluations for each existing solution for each objective. The operator may impose a filter to limit the size of this summary, as described earlier. The user preferably uses a solution editor to view the details of any particular solution, and the operator may make whatever manual modifications are necessary under the circumstances. In this regard, the agents can operate as a means of identifying viable candidate solutions, but the design of this step ensures that the operator has control over the final, chosen solution. The summary presented to the user may be sorted according to different objectives, and the operator can place additional bounds requirements so as to limit the number of solutions currently under consideration. The user may re-evaluate a manually modified solution and compare the results with solutions automatically generated by the system agents.

It is important to note that the decision-support aspects of the present method can be supported in large part by the ability of agents to produce varied solution alternatives in conjunction with an operator who can decide which alternative is worth examining under existing circumstances. This methodology is inherently flexible for accommodating changing circumstances because the method does not provide a single solution which must be either accepted or rejected by the operator. This more flexible methodology is necessary in complex problem-solving environments that admit no single solution methodology under all circumstances.

A summary screen may also make use of information about the decision maker's objectives, to anticipate which solutions are likely to be of interest to the operator. Summaries of solutions which are likely to be of interest are preferably placed at the top of the list. This makes it easier for the operator to quickly identify solutions which are worth being examined in greater detail.

APPLICATION OF THE PRESENT INVENTION TO TRANSPORTATION PLANNING

The present invention, when applied to transportation planning problems, can provide a unique environment in which to perform complex and dynamic decision making. While historically, problem solving methods have focused on producing a single solution to some specific objective, the invention described above recognizes that in real world situations, there may be no single best solution and therefore, no single best solving method. The invention is therefore important because it not only can encapsulate multiple problem solving methodologies under one environment, but it also can allow the operator to play an active role in the problem solving process.

In transportation planning, this is crucial for several reasons.
1. It is often impossible to capture every constraint and objective under a single problem solving method.
2. The constraints and objectives themselves, may be changing over time.
3. Even when the constraints are tractable and static, what constitutes the best solution may not be well defined because as described earlier, many solution objectives are intrinsically qualitative in nature.

In this section, we consider an idealistic problem of shipping a finite set of items to a particular destination. The items have physical characteristics such as weight and dimensions. The items are each produced at a specified date and time. They are available for loading at a loading dock facility at a specified date and time, and they are due at the customer site on a specified date and time. This customer is specified as part of the input problem. Loading crews have choices as to what vehicles may be employed to deliver the goods. They may use trucks, trains, or ships, and there may be multiple alternatives for each of these modes of transportation. Each vehicle type has its own weight and volume restrictions. Industry loading standards may impose additional constraints on how vehicles may or may not be loaded. The goal of the loading crews is to minimize the cost associated with employing each vehicle, while ensuring that all loading constraints are satisfied and that the goods arrive at the destination on time. As noted above, there are many tradeoffs that can come into play at this point, and it is this aspect of the problem domain that makes the present invention as described above both useful and necessary.

In one implementation, a solution component consists of a loading pattern defined as a single vehicle loaded with some set of items. For example: "A Truck containing X items of order $O_1$ and Y items of order $O_2$." Each loading pattern may be used multiple times. A solution is a set of loading patterns with an associated count of how often the pattern is used, such that the total number of goods shipped exactly equals the total number of goods sitting on the floor waiting to be shipped. Thus, if our goal is to ship 100 items of order $O_1$ and 200 items of order $O_2$, a solution that satisfies this requirement is:
  2 Railcar each containing
    50 items of order $O_1$
    50 items of order $O_2$
  5 Trucks each containing
    20 items of order $O_2$ In this solution, there are two patterns, one which defines how to load a railcar, and one that defines how to load a truck. The method can readily incorporate other types of transportation, or subclasses of specific vehicles of a given mode of transportation. The first pattern is repeated twice, the second five times.

The solution component generator 26 produces loading patterns up to some limit, say 50,000. The generator 26 is responsible for ensuring that each pattern is legal with respect to vehicle loading constraints and limits. A bound on the number of patterns generated is often necessary because the combinatorics of the problem make exhaustive pattern generation untenable for all but the smallest problems. Solution components (loading patterns) are placed in the solution component store 28.

Agents employ a number of techniques to determine how to use these solution components to form a valid solution. Specifically, constructor agents must determine how many times each pattern should be repeated subject to the predefined objectives. Recall, however, that employing the solution component store 28 is not mandatory. Constructor agents may mimic existing heuristics employed by real-world transportation planners who typically do not attempt to generate beforehand thousands of possible loading patterns. Constructors may employ heuristics that select patterns in a so-called greedy fashion (i.e., select lowest cost-per-ton components first. Determine the maximum number of repetitions of that pattern. Repeat until all items to be shipped have been accounted for). Other constructors may employ more sophisticated optimization techniques such as linear programming or mixed-integer programming. For the invention to work effectively, it is necessary to instantiate the agent store 16 with the appropriate agents.

In the context of transportation planning, there are a number of viable improver agents that can be employed. An improver may shift items from one vehicle to another in order to reduce the value of a particular objective. Improvers may attempt to simplify loading patterns by trying to place fewer types of items in any particular vehicle. Improvers may try to combine patterns employed by two or more existing solutions in order to produce a hybrid solution that combines advantages of each existing solutions. Alternatively, improvers may employ random techniques that attempt to produce an improved solution by trial and error.

Destroyer agents need not be specific to the transportation problem, as they have a relatively generic role to play in the realization of the method: namely, to eliminate clearly bad solutions that have little chance of being useful. It is generally not possible to predict a prior how the population of solutions will change over time as a function of the agents placed within the agent store. The solutions produced for the transportation planner/operator reflect tradeoffs between cost, tardiness, satisfaction of customer and vehicle constraints, and so on.

The transportation planner/operator may interrupt the execution of agents to examine the current contents of the population. If the destination corresponds to a particularly important customer, the operator may employ a filter which ensures that only on-time solutions are considered. Even with this constraint, there may be a number of tradeoffs to consider including cost, potential for loading dock disruptions, and quality concerns that can come into play if the customer's special requests are not fully satisfied.

The operator may modify a particular transportation plan, evaluate it, and enter it back into the population where agents can then continue to make use of it if they desire in their attempt to produce further solutions. The evaluator 20 can provide users with a built-in calculator for quickly understanding the implications of the modifications they make. It is important to note, that the operator may act not only as an improver, modifying existing solutions, but also as a constructor creating solutions ab. initio.

The problem of figuring out how to ship a group of items going to a particular destination is but one aspect of the transportation planning domain. A higher-level aspect of the problem involves determining how to form these groups, that is, how to reduce the overall problem of shipping multiple items destined for multiple destinations into a more manageable collection of subproblems.

If a group or subproblem contains a large number of items, there will generally be more opportunities for cost savings, but this may affect the timelines of the solution as loading crews must wait until all items to be placed in a particular vehicle are actually produced.

The task of grouping products can be addressed by special-purpose grouping agents operating on their own solution store. Each solution can then be handed off to group-solver agents that create multiple solutions for each collection of items. Thus, the methodology can be recursive. In this context, the operator preferably makes use of a solution modifier/editor that is also correspondingly recursive in nature.

Attention is now directed to FIG. 4, which shows canonical elements (numerals 36–42) of a computer for machine realization of the present invention. In particular, the method steps 1–7 summarized above, are referenced to the computer elements, and it is noted that the method steps are readily coded into a conventional programming language like C++, for machine processing.

What is claimed:

1. A method for effecting computer implemented decision-support, the method comprising the steps of:
    1) inputting to the computer data comprising information relevant to a specified problem;
    2) choosing a set of solution generators for the specified problem;
    3) instantiating the set of solution generators in memory;
    4) running in a CPU the set of solution generators for producing ex nihilo a set of candidate solutions relevant to the specified problem;
    5) filtering the set of candidate solutions for producing at least one selectable candidate solution in accordance with an independent metric;
    6) outputting on a display the at least one selectable candidate solution; and
    7) dynamically interacting with the at least one of selectable candidate solutions for generating a refined set of candidate solutions.

2. A method according to claim 1, wherein step 1 comprises inputting information relevant to transportation planners.

3. A method according to claim 2, wherein the information comprises at least one of products to transport, carrier rates, and vehicle weights.

4. A method according to claim 1, wherein step 1 comprises inputting information relevant to scheduling production of paper.

5. A method according to claim 4, wherein the information comprises at least one of products to manufacture, a description of the manufacturing facilities, and the customer demands.

6. A method according to claim 1, wherein step 1 comprises inputting information relevant to production planning.

7. A method according to claim 6, wherein the information comprises at least one of customer demands, availability of raw materials, and a description of the manufacturing facilities.

8. A method according to claim 1, wherein step 2 comprises choosing a set of solution generators based on exact methods.

9. A method according to claim 1, wherein step 2 comprises choosing a set of solution generators based on heuristics.

10. method according to claim 1, wherein the solution generators in step 4 run on multiple CPUs.

11. A method according to claim 1, wherein the filtering in step 5 comprises choosing candidate solutions which are not dominated by any other candidate solutions with respect to evaluation objectives defined by a decision maker.

12. A method according to claim 11, wherein the evaluation objectives comprise at least one of customer satisfaction, profit to an enterprise, and manufacturing disruptions.

13. A method according to claim 11, wherein step 7 comprises generating a refined set of candidate solutions by constraining the evaluation objectives.

14. A method according to claim 1, wherein the filtering in step 5 comprises choosing candidate solutions generated by a decision maker.

15. A method according to claim 1, wherein step 6 comprises ordering candidate solutions on the display.

16. A method according to claim 15, wherein step 6 comprises ordering candidate solutions on a display according to an operator's previous selections.

17. A method according to claim 15, wherein step 6 comprises ordering candidate solutions on the display according to a weighted sum of the performance of solutions on objectives specified by a user.

18. A method according to claim 1, wherein step 7 comprises dynamically and recursively interacting with the CPU, the memory and the display for addressing component aspects of the specified problem.

19. A computer program device readable by a machine, tangibly embodying a program of instructions executable by a machine to perform method steps for effecting computer implemented decision-support, the method comprising the steps of:
   1) inputting to the computer data comprising information relevant to a specified problem;
   2) choosing a set of solution generators based on linear programming for the specified problem;
   3) instantiating the set of solution generators in memory;
   4) running in a CPU the set of solution generators for producing a set of candidate solutions relevant to the specified problem;
   5) filtering the set of candidate solutions for producing at least one selectable candidate solution in accordance with an independent metric;
   6) outputting on a display the at least one selectable candidate solution; and
   7) dynamically interacting with the at least one of selectable candidate solutions for generating a refined set of candidate solutions.

20. A computer program device readable by a machine, tangibly embodying a program of instructions executable by a machine to perform method steps for effecting computer implemented decision-support, the method comprising the steps of:
   1) inputting to the computer data comprising information relevant to a specified problem;
   2) choosing a set of solution generators based on mixed integer programming for the specified problem;
   3) instantiating the set of solution generators in memory;
   4) running in a CPU the set of solution generators for producing a set of candidate solutions relevant to the specified problem;
   5) filtering the set of candidate solutions for producing at least one selectable candidate solution in accordance with an independent metric;
   6) outputting on a display the at least one selectable candidate solution; and
   7) dynamically interacting with the at least one of selectable candidate solutions for generating a refined set of candidate solutions.

21. A method for effecting computer implemented decision-support, the method comprising the steps of:
   1) inputting to the computer data comprising information relevant to a specified problem;
   2) choosing a set of solution generators for the specified problem;
   3) instantiating the set of solution generators in memory;
   4) running in a CPU the set of solution generators for producing a set of candidate solutions relevant to the specified problem;
   5) filtering the set of candidate solutions for producing at least one selectable candidate solution in accordance with an independent metric;
   6) outputting on a display the at least one selectable candidate solution; and
   7) dynamically interacting with the display and the memory and CPU by editing the at least one selectable candidate solution.

22. A method according to claim 21, wherein editing further comprises adding a solution created by editing to the at least one candidate solution set.

23. A method for effecting computer implemented decision-support, the method comprising the steps of:
   1) inputting to the computer data comprising information relevant to a specified problem;
   2) choosing a set of solution generators for the specified problem;
   3) instantiating the set of solution generators in memory;
   4) running in a CPU the set of solution generators for producing a set of candidate solutions relevant to the specified problem;
   5) filtering the set of candidate solutions for producing at least one selectable candidate solution in accordance with an independent metric;
   6) outputting on a display the at least one selectable candidate solution; and
   7) dynamically interacting with the at least one of selectable candidate solutions for generating a refined set of candidate solutions and producing additional selectable candidate solutions.

24. The method of claim 23, wherein said dynamic interaction includes communicating exact modifications to computer programs, said programs causing said modifications.

25. The method of claim 23, wherein said dynamic interaction includes interacting with computer programs in directing said computer programs to cause modifications.

26. The method of claim 23, wherein said dynamic interaction includes communicating a general goal for modifications to computer programs to focus said computer programs' search in an area of interest.

27. The method of claim 23, wherein said dynamic interaction includes making preliminary modifications and computer programs making final modifications.

28. A computer program device readable by a machine, tangibly embodying a program of instructions executable by a machine to perform method steps for effecting computer implemented decision-support, the method comprising the steps of:
   1) inputting to the computer data comprising information relevant to a specified problem;
   2) choosing a set of solution generators for the specified problem;
   3) instantiating the set of solution generators in memory;
   4) running in a CPU the set of solution generators for producing ex nihilo a set of candidate solutions relevant to the specified problem;
   5) filtering the set of candidate solutions for producing at least one selectable candidate solution in accordance with an independent metric;
   6) outputting on a display the at least one selectable candidate solution; and
   7) dynamically interacting with the at least one of selectable candidate solutions for generating a refined set of candidate solutions.

29. The computer program device of claim 28, wherein step 1 comprises inputting information relevant to transportation planners.

30. The computer program device of claim 29, wherein the information comprises at least one of products to transport, carrier rates, and vehicle weights.

31. The computer program device of claim 28, wherein step 1 comprises inputting information relevant to scheduling production of paper.

32. The computer program device of claim 31, wherein the information comprises at least one of products to manufacture, a description of the manufacturing facilities, and the customer demands.

33. The computer program device of claim 28, wherein step 1 comprises inputting information relevant to production planning.

34. The computer program device of claim 33, wherein the information comprises at least one of customer demands, availability of raw materials, and a description of the manufacturing facilities.

35. The computer program device of claim 28, wherein step 2 comprises choosing a set of solution generators based on exact methods.

36. The computer program device of claim 28, wherein step 2 comprises choosing a set of solution generators based on heuristics.

37. The computer program device of claim 28, wherein the solution generators in step 4 run on multiple CPUs.

38. The computer program device of claim 28, wherein the filtering in step 5 comprises choosing candidate solutions which are not dominated by any other candidate solutions with respect to evaluation objectives defined by a decision maker.

39. The computer program device of claim 38, wherein the evaluation objectives comprise at least one customer satisfaction, profit to an enterprise, and manufacturing disruptions.

40. The computer program device of claim 38, wherein step 7 comprises generating a refined set of candidate solutions by constraining the evaluation objectives.

41. The computer program device of claim 28, wherein the filtering in step 5 comprises choosing candidate solutions generated by a decision maker.

42. The computer program device of claim 28, wherein step 6 comprising ordering candidate solutions on the display.

43. The computer program device of claim 42, wherein step 6 comprises ordering candidate solutions on a display according to an operator's previous selections.

44. The computer program device of claim 42, wherein step 6 comprises ordering candidate solutions on the display according to a weighted sum of the performance of solutions on objectives specified by a user.

45. The computer program device of claim 28, wherein step 7 comprises dynamically and recursively interacting with the CPU, the memory and the display for addressing component aspects of the specified problem.

46. A computer program device readable by a machine, tangibly embodying a program of instructions executable by a machine to perform method steps for effecting computer implemented decision-support, the method comprising the steps of:

1) inputting to the computer data comprising information relevant to a specified problem;

2) choosing a set of solution generators based on linear programming for the specified problem;

3) instantiating the set of solution generators in memory;

4) running in a CPU the set of solution generators for producing a set of candidate solutions relevant to the specified problem;

5) filtering the set of candidate solutions for producing at least one selectable candidate solution in accordance with an independent metric;

6) outputting on a display the at least one selectable candidate solution; and 7) dynamically interacting with the at least one of selectable candidate solutions for generating a refined set of candidate solutions.

47. A computer program device readable by a machine, tangibly embodying a program of instructions executable by a machine to perform method steps for effecting computer implemented decision-support, the method comprising the steps of:

1) inputting to the computer data comprising information relevant to a specified problem;

2) choosing a set of solution generators based on mixed integer programming for the specified problem;

3) instantiating the set of solution generators in memory;

4) running in a CPU the set of solution generators for producing a set of candidate solutions relevant to the specified problem;

5) filtering the set of candidate solutions for producing at least one selectable candidate solution in accordance with an independent metric;

6) outputting on a display the at least one selectable candidate solution; and 7) dynamically interacting with the at least one of selectable candidate solutions for generating a refined set of candidate solutions.

48. A computer program device readable by a machine, tangibly embodying a program of instructions executable by a machine to perform method steps for effecting computer implemented decision-support, the method comprising the steps of:

1) inputting to the computer data comprising information relevant to a specified problem;

2) choosing a set of solution generators for the specified problem;

3) instantiating the set of solution generators in memory;

4) running in a CPU the set of solution generators for producing a set of candidate solutions relevant to the specified problem;

5) filtering the set of candidate solutions for producing at least one selectable candidate solution in accordance with an independent metric;

6) outputting on a display the at least one selectable candidate solution; and 7) dynamically interacting with the display and the memory and CPU by editing the at least one selectable candidate solution.

49. The computer program device of claim 48, wherein editing further comprises adding a solution created by editing to the at least one candidate solution set.

50. A computer program device readable by a machine, tangibly embodying a program of instructions executable by a machine to perform method steps for effecting computer implemented decision-support, the method comprising the steps of:

1) inputting to the computer data comprising information relevant to a specified problem;

2) choosing a set of solution generators for the specified problem;

3) instantiating the set of solution generators in memory;

4) running in a CPU the set of solution generators for producing a set of candidate solutions relevant to the specified problem;

5) filtering the set of candidate solutions for producing at least one selectable candidate solution in accordance with an independent metric;

6) outputting on a display the at least one selectable candidate solution; and 7) dynamically interacting with the at least one of selectable candidate solutions for generating a refined set of candidate solutions and producing additional selectable candidate solutions.

51. The computer program device of claim 50, wherein said dynamic interaction includes communicating exact modifications to computer programs, said programs causing said modifications.

52. The computer program device of claim 50, wherein said dynamic interaction includes interacting with computer programs in directing said computer programs to cause modifications.

53. The computer program device of claim 50, wherein said dynamic interaction includes communicating a general goal for modifications to computer programs to focus said computer programs' search in an area of interest.

54. The computer program device of claim 50, wherein said dynamic interaction includes making preliminary modifications and computer programs making final modifications.

* * * * *